Nov. 11, 1952 S. KNEE Re. 23,577

COMBINATION BILLFOLD AND PURSE

Original Filed March 18, 1948

INVENTOR.
Simon Knee
BY
Harry Cohen
ATTORNEY

Reissued Nov. 11, 1952

Re. 23,577

UNITED STATES PATENT OFFICE 23,577

COMBINATION BILLFOLD AND PURSE

Simon Knee, Newark, N. J.

Original No. 2,579,833, dated December 25, 1951, Serial No. 15,693, March 18, 1948. Application for reissue March 18, 1952, Serial No. 277,187

5 Claims. (Cl. 150—35)

Matter enclosed in heavy brackets [ ] appears in the original patent but forms no part of this reissue specification; matter printed in italics indicates the additions made by reissue.

The present invention relates to pocketbooks and more particularly to a combination bill fold and purse of the "French purse" type.

The primary object of the present invention is to provide a combination bill fold and purse each having provision for direct access thereto independently of the other in either the folded or flat condition of the bill fold.

The above and other objects, features and advantages of the present invention will be fully understood from the following description considered in connection with the accompanying illustrative drawings.

Figure 1:
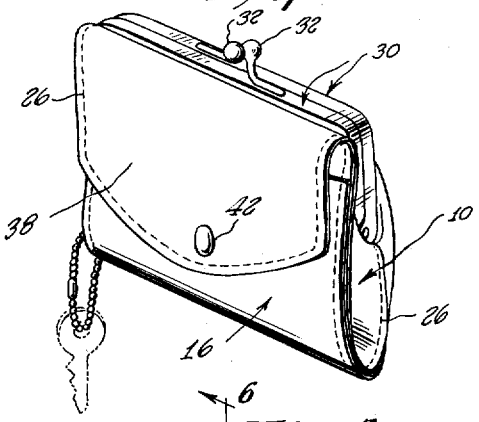
Fig. 1 is a perspective view of a combination bill fold and purse embodying the present invention, the purse and bill fold being in folded relation.
Figure 4:
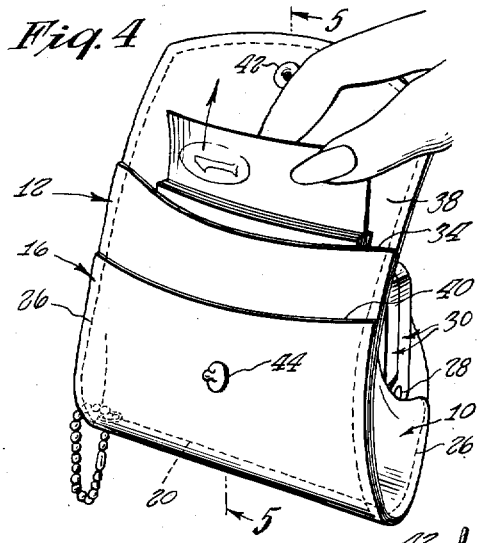
Fig. 4 is a view similar to Fig. 1, showing the end closure of the bill fold open.
Figure 2:
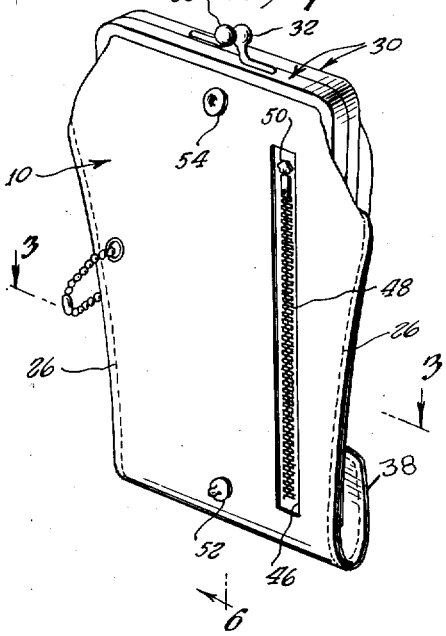
Fig. 2 is a perspective view, showing the bill fold unfolded.
Figure 3:
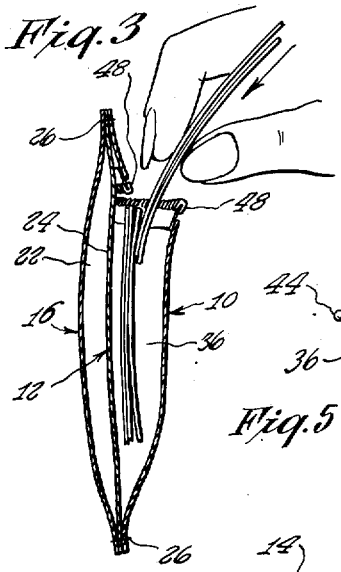
Fig. 3 is a sectional view on the line 3—3 of Fig. 2, the side closure of the bill fold being open.
Figure 5:
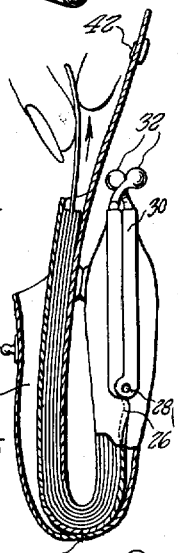
Fig. 5 is a view partially in section taken on the line 5—5 of Fig. 4.
Figure 6:
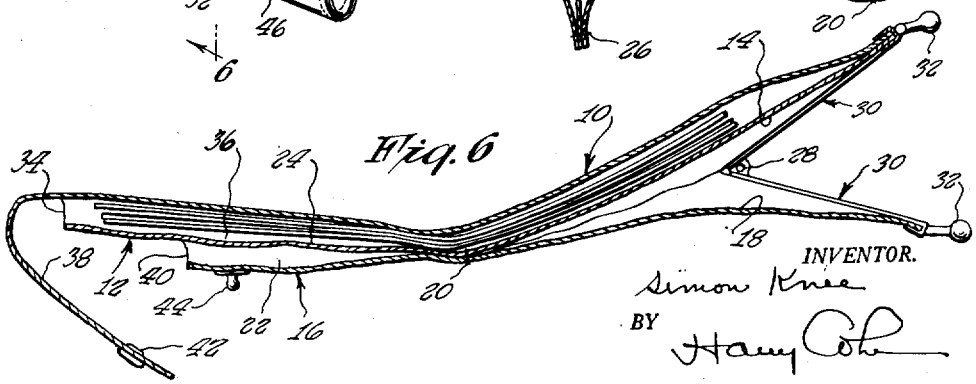
Fig. 6 is a longitudinal sectional view of the combination bill fold and purse in the unfolded condition thereof, the end closure being unfastened *and certain fastener elements being omitted.*

Referring now to the drawings in detail, the combination purse and bill fold comprises an outer strip 10 forming one wall of the bill fold, an inner or intermediate strip 12 which forms the other wall of the bill fold and provides one wall 14 of the purse, and an outer strip 16 which provides the other wall 18 of the purse, strips 12 and 16 being stitched together along the transverse line 20 forming the closed bottom of the purse. As here shown strip 16 extends beyond stitching 20 and thus forms a pocket 22 with the confronting part 24 of strip 12, the bottom of said pocket being formed by stitching 20, but it will be understood that if the advantage of this pocket is to be foregone, said strip 16 may terminate substantially at said line of stitching.

The side edges of strips 10, 12 and 16 are stitched together throughout their co-extensive lengths by stitching 26 as far as the pivots 28 between the legs of the U-shaped channel frame members 30 which form a well known type of closure for the purse. The usual releasable clasping elements 32 are provided on said frame members for releasably closing the purse. At the purse end of the combination article, strips 10 and 12 are clamped and thus secured in the channel of one of the frame members 30 and strip 16 is clamped and thus secured in the channel of the other of said frame members. It will be understood, however, that this invention is not limited to closures of the U-frame type. At the end of the article opposite the purse end thereof, strips 10 and 12 are free from direct securement to each other and thus form an end opening 34 for the bill fold compartment 36. Strip 10 extends outwardly beyond the adjacent end of wall 12 and forms a foldable closure flap 38 for opening 34 and also for opening 40 of pocket 22. As here shown companion snap fasteners 42 and 44 are provided on strips 10 and 16, respectively, for releasably securing flap 38 in closed position.

The outer wall or strip 10 is provided with an elongated opening 46 providing an access opening for the bill fold when the latter is in its flat or non-folded condition. Said opening 46 is somewhat longer than paper money so that the latter may be inserted in full length form in the bill fold, or removed therefrom, through said opening 46, i. e., without folding of the money. As here shown, opening 46 is provided with a slide-fastener closure 48, the slider of which is shown at 50 in the closed condition of the slide-fastener closure.

As shown in the drawings, the bill fold constituted by strips 10 and 12 is foldable along a transverse substantially median line from its flat form into folded form at one side of the purse, and when strip 16 extends beyond stitching 20, it is also foldable with the bill fold so as to lie at said side of the purse. Suitable separable fastener means here shown as snap fasteners 52 and 54 are provided on wall 10 for releasably securing the bill fold in said folded condition against the adjacent side of the purse or, conversely, for releasably holding the purse aganist the adjacent side of the folded bill fold, i. e., in side by side relation.

In the folded condition of the bill fold, access may be had thereto directly and independently of the purse so that one or more bills may be removed from the bill fold through end opening 34, flap 38 being unfastened for that purpose, without unfastening snap fasteners 52 and 54. When flap 38 is unfastened access may be had directly to pocket 22 independently of both the bill fold and the purse. It will be noted that when flap 38 is opened, the end portion of strip 12 adjacent opening 34 may be moved away from the confronting part of strip 10 to provide room for observation of the bills in the bill fold and for the insertion of the fingers so that one or more bills may be selected and removed from the bill fold by grasping the selected money bill between the fingers and pulling the same through end opening 34 without removing the other bills. Thus it is unnecessary either to unfold the wallet or to open the purse when it is desired to remove one or more bills from the bill fold or to remove an object from pocket 22. It will be understood that when the wallet is unfolded, the paper money lies smoothly and flat for its full length between the opposed walls 10 and 12 of the bill fold, and that said walls are of such length that, in the folded condition of the bill fold, the paper money or bills extend well beyond the fold line of the bill fold for convenient access thereto through end opening 34 of the bill fold. On the other hand, since there is no opening between the interior of the bill fold, there is no possibility of coins or other objects falling from the purse into the bill fold, and likewise displacement or loss of coins or other objects from the purse in removing bills from the folded bill fold cannot occur because such removal is accomplished externally of the purse and not through the interior thereof.

It will be understood that strips 10, 12 and 16 are formed of foldable sheet material such as for example but without limitation, leather, or fabric, or sheet plastic, or combinations of such or other suitable foldable materials.

Thus it is seen that the combination article described above is well adapted to accomplish the purposes of my present invention, but it will be understood that various changes in the details of construction and in the form or shape of the article or in the types of closures may be made without departing from the underlying idea or principles of the invention within the scope of the appended claims.

Having thus described my invention, what I claim and desire to secure by Letters Patent, is:

1. A combined bill fold and purse, comprising opposed outer and inner walls of foldable material, said walls being secured together at their opposing side edges for forming a bill fold compartment therebetween, a third wall opposed to a part of said inner wall and joined with the latter at its opposing side edges and along a transverse line spaced from one end thereof and forming a purse therewith, releasable closure means for said purse, said bill fold having a transverse opening located externally of the purse, closure means for said transverse opening, said outer and inner walls being foldable along a transverse line from a substantially flat form to a folded form in side by side relation with the purse, releasable companion fastener elements on said outer wall for releasably securing said bill fold and purse in said side by side relation, said opening of the bill fold providing direct access to the interior of the bill fold for the removal of paper money therefrom while said bill fold is in said folded condition thereof and while said closure means of the purse is closed, said third wall extending beyond said line of fold for a substantial distance toward said transverse opening at the bill fold and forming an additional pocket with a confronting part of said inner wall, said closure means for said transverse opening comprising an end portion projecting outwardly from said outer wall beyond the adjacent end of said inner wall and foldable over said inner wall and over the outer surface of said third wall to provide a common releasable closure for said transverse opening of said bill fold and for said additional pocket.

2. A combined bill fold and purse, comprising opposed outer and inner walls of foldable material, said walls being secured together at their opposing side edges for forming a bill fold compartment therebetween, a third wall opposed to a part of said inner wall and joined with the latter at its opposing side edges and along a transverse line spaced from one end thereof and forming a purse therewith, releasable closure means for said purse, said bill fold having a transverse opening located externally of the purse, closure means for said transverse opening, said outer and inner walls being foldable along a transverse line from a substantially flat form to a folded form in side by side relation with the purse, releasable companion fastener elements on said outer wall for releasably securing said bill fold and purse in said side by side relation, said opening of the bill fold providing direct access to the interior of the bill fold for the removal of paper money therefrom while said bill fold is in said folded condition thereof and while said closure means of the purse is closed, said third wall extending beyond the line of fold toward said transverse opening at the bill fold and forming an additional pocket with a confronting part of said inner wall, said third wall terminating inwardly of the adjacent end of said inner wall to define therebetween a transverse opening for said additional pocket and the portion of said confronting part extending from said latter opening to said adjacent end constituting a guide for access to said additional pocket through said latter opening, said closure means for said first mentioned transverse opening comprising en end portion projecting outwardly from said outer wall beyond said adjacent end of said inner wall and foldable over said inner wall and over the outer surface of said third wall to provide a common releasable closure for both said transverse openings.

3. *A combined billfold and purse, comprising a pair of outer walls and an inner wall all joined to each other at their adjacent side edges, coextensively thereof, one of said outer walls being also joined to said inner wall along a transverse line intermediate the opposite ends of said walls and forming pockets disposed at opposite sides, respectively, of said transverse line of juncture, each of said pockets having a transversely extending end opening, the other of said outer walls and said inner wall defining the billfold, said billfold having a transversely extending end opening adjacent one of said first mentioned end openings, said three walls being foldable about a transverse line whereby all of said end openings are disposed adjacent each other, and releasable closure means for said openings.*

4. *A combined billfold and purse, comprising a pair of outer walls and an inner wall all joined to each other at their adjacent side edges, coextensively thereof, one of said outer walls being also joined to said inner wall along a transverse line intermediate the opposite ends of said walls and forming pockets disposed at opposite sides, respectively, of said transverse line of juncture, each of said pockets having a transversely extending end opening, the other of said outer walls and said inner wall defining the billfold, said billfold having a transversely extending end opening*

*adjacent one of said first mentioned end openings, said three walls being foldable about a transverse line whereby all of said end openings are disposed adjacent each other, said end opening of the billfold being located externally of said pocket defining walls, and one of said walls having a flap extension foldable over said end opening of the billfold as a closure thereof.*

5. *A combined billfold and purse, comprising a pair of outer walls and an inner wall all joined to each other at their adjacent side edges, coextensive thereof, one of said outer walls being also joined to said inner wall along a transverse line intermediate the opposite ends of said walls and forming pockets disposed at opposite sides, respectively, of said transverse line of juncture, each of said pockets having a transversely extending end opening, the other of said outer walls and said inner wall defining the billfold, said billfold having a transversely extending end opening adjacent one of said first mentioned end openings, said three walls being foldable about a transverse line whereby all of said end openings are disposed adjacent each other, said end opening of the billfold being located externally of*

*said pocket defining walls, and separate closure means for said end opening of the billfold and for the end opening of one of said pockets, respectively.*

SIMON KNEE.

REFERENCES CITED

The following references are of record in the file of this patent or the original patent:

UNITED STATES PATENTS

| Number | Name | Date |
|---|---|---|
| 1,084,101 | Nover | Jan. 13, 1914 |
| 2,249,558 | Green | July 15, 1941 |
| 2,298,543 | Schmidt | Oct. 13, 1942 |
| 2,397,393 | Wetterhahn | Mar. 26, 1946 |
| 2,428,707 | Harty | Oct. 7, 1947 |
| 2,488,444 | St. Thomas | Nov. 15, 1949 |
| 2,519,456 | Hack | Aug. 22, 1950 |

FOREIGN PATENTS

| Number | Country | Date |
|---|---|---|
| 93,707 | Switzerland | July 1, 1922 |
| 582,797 | Great Britain | Nov. 28, 1946 |